United States Patent [19]

Streck et al.

[11] Patent Number: 5,009,368
[45] Date of Patent: Apr. 23, 1991

[54] CONSTANT-PRESSURE, VARIABLE-VOLUME IRRIGATION SPRINKLERS

[75] Inventors: Donald A. Streck, Ojai; Jerry R. Iggulden, Santa Clarita, both of Calif.

[73] Assignee: Light Ideas Incorporated, Woodland Hills, Calif.

[21] Appl. No.: 369,659

[22] Filed: Jun. 21, 1989

[51] Int. Cl.$^5$ ............................ B05B 3/04; B05B 1/08
[52] U.S. Cl. .................................. 239/70; 239/99; 239/240
[58] Field of Search ................... 239/DIG. 1, 67, 97, 239/99, 101, 236, 237, 240, 263.3, 70

[56] References Cited

U.S. PATENT DOCUMENTS

| | | | |
|---|---|---|---|
| 3,090,563 | 5/1963 | Cheeseboro | 239/240 |
| 3,321,138 | 5/1967 | Curry | 239/99 |
| 3,383,047 | 5/1968 | Hauser | 239/240 |
| 4,277,029 | 7/1981 | Rabitsch | 239/DIG. 1 |
| 4,613,077 | 9/1986 | Aronson | 239/DIG. 1 |

Primary Examiner—Andres Kashnikow
Assistant Examiner—Karen B. Merritt
Attorney, Agent, or Firm—Donald A. Streck

[57] ABSTRACT

Various apparatus and methods are shown for controlling the emissions from sprinkler heads in an irrigation system to cause variable volume irrigation at a constant pressure. In one approach, a rotating sprinkler head is rotated at different speeds as a function of the radial position of the emerging water stream so that dryer areas have slower rotational movement of the sprinkler head and, thereby, a greater volume of water discharged thereon. In another approach, the water to the sprinkler head is turned on and off during the irrigation period rather than being turned on at the beginning and off at the end. As a result, multiple heads which are individually turned off and on have a better average water distribution. Likewise, high-precipitation sprinkler heads are made to operate with an average low-precipitation so that run-off and water waste are virtually eliminated.

16 Claims, 7 Drawing Sheets

CONSTANT-PRESSURE, VARIABLE-VOLUME IRRIGATION SPRINKLERS

BACKGROUND OF THE INVENTION:

This invention relates to irrigation systems and, more particularly, to a control device for controlling the flow of irrigation water between an inlet and an outlet thereof comprising, a hollow body having an inlet thereto and an outlet therefrom; a rotating drive positioned within the body; and, flow control means disposed within the body between the inlet and the outlet and driven by the rotating drive for varying the volume of water discharged through the outlet to areas watered by a sprinkler head connected to the outlet without changing the pressure of the water.

Figure 1:
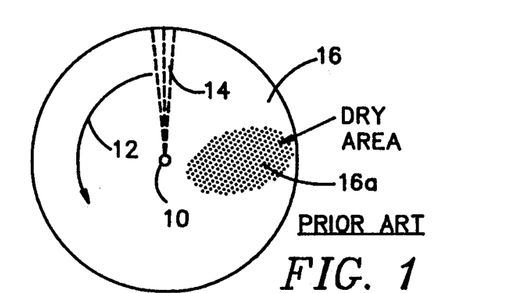
FIG. 1 is a simplified drawing depicting the prior art method of irrigating an area containing portions requiring differing quantities of water.

Irrigation systems are probably one of the least improved areas of technology. While electronics, for example, is constantly under a state of improvement and innovation, irrigation sprinklers and their associated control systems go for long periods with virtually no functional changes whatsoever. For years, the state of the art was an upward-facing orifice screwed onto the end of a garden hose. Later, oscillating sprinklers (also fastened to the end of a garden hose) became popular. A major step change in sprinkling technology came with the introduction of the impulse sprinkler. As depicted in FIG. 1, such a sprinkler 10 revolves in a circle as symbolized by the arrow 12 emitting a stream of water 14. A variation of the impulse sprinkler allows the sprinkler to revolve back and forth over an arc of a circle as set by adjustable stops.

A more recent improvement to the sprinkler art is the low-precipitation sprinkler head. While the impulse sprinkler head typically requires a large volume of water at high pressure to operate, the low-precipitation sprinkler heads incorporate a water-driven turbine drive to slowly turn the output nozzle portion which emits fine streams of water. With such heads, an adobe-soil hillside such as found in many areas of California can be watered with virtually no runoff (i.e. wasted water) as occurs with high-volume prior art sprinkler heads as described above.

To water large areas which are unwaterable with a single sprinkler head attached to the end of a garden hose (and for added convenience) the prior art devised sprinkler systems wherein a plurality of sprinkler heads are attached to the branches of a system under the control of one or more manual or electrically/electronically controlled valves. The introduction of plastic water pipe greatly simplified the installation of such systems and lead to their general adoption in dry areas requiring constant artificial irrigation such as the southwestern areas of the United States. Typically, the branch pipes from the valves to the sprinkler heads are buried in the ground with riser pipes extending up to the exposed sprinkler heads.

Whether it is a single sprinkler head mounted on the end of a garden hose or a sprinkler system comprising multiple sprinkler heads, all these prior art irrigation approaches suffer from a common problem as depicted in FIG. 1. Within the area 16 being watered, the water requirements for proper irrigation are not constant. For example, there may be a dry spot 16a requiring more water than the rest of the area 16. In the prior art, there are two "solutions" to the problem—neither of which is really a solution. If the area 16 is watered the proper amount, the dry area 16a is not watered sufficiently. If the dry area 16a is watered the proper amount, the rest of the area 16 is overwatered. Thus, the user is placed on the horns of a dilemma. Either waste water (in an area that is typically in a drought condition) and possibly kill plants by overwatering or possibly kill plants from underwatering.

While many prior art sprinkler heads contain an adjustment for the flow volume out, they do so at a sacrifice of the pressure and flow rate as well. As a consequence, the head no longer covers the same area. Thus, peripheral areas that were previously watered by the head are no longer watered at all in order that the area close to the head is watered less. This, of course, has a major drawback in that no matter how long the head is left on, the areas no longer reached by the emitted stream will never be watered (barring flooding of the area as a result of total water volume emitted—a totally wasteful approach).

One solution would be to have a single rotating sprinkler head that revolved more slowly where more water was needed so that a greater volume of water would be discharged where more water was needed.

Another solution would be to have a multiple sprinkler head system wherein heads in areas requiring less water could be set to have the same force and pressure as other heads (thus covering the same area) yet emit a lower total volume of water.

Contemporary sprinkler systems suffer from additional problems, particularly under the drought conditions that seem to be facing many parts of the country more and more as population densities (and corresponding demands on the limited water available) continue to rise. For example, unless a sprinkler system employs the low precipitation sprinkler heads as described above, much of the irrigation water applied to the soil simply runs off. In large open fields this is not a problem. In urban settings, however, what runs off the lawn and planting areas simply runs down the driveway and walkways into the gutter and into the storm drains and is completely wasted. Unfortunately, since the low precipitation sprinkler heads are typically more expensive than a simple orifice opening sprinkler head or a plastic impulse sprinkler head, most installations employ the lower-cost, higher-discharge heads.

Another typical problem the inability to provide proper action and coverage with the number of sprinkler heads operating at a time under the flow conditions typically available. Most residences have a ¾" or 1" line into the house. Usually, the supply line to the sprinkler valve manifold is no more than ¾" and it would be unusual to find that the branch lines from each valve to the various sprinkler head connected to it are greater than ½". In a lawn area where perhaps six or eight simple orifice opening sprinkler heads are connected to a single valve and operate simultaneously, the flow rate (actually a spray pattern) of the heads is of such a low volume per unit time that the coverage is generally adequate. Where several larger orifice impact sprinkler heads are operated simultaneously, however, one may find that unless the line pressure is very high, the heads do not operate well. For one, they may not cycle consistently between their two modes of operation when covering an arc of less than 360°. For another, their deflected spray pattern may be insufficient to water properly close to the head such that only any annular area at the end of the main stream is properly watered.

Wherefore, it is an object of this invention to provide a single rotating sprinkler head that revolves more slowly where more water is needed so that a greater volume of water is discharged where more water is needed.

It is another object of the invention to provide a sprinkler head for use in a multiple sprinkler head system wherein heads in areas requiring less water can be set to have the same force and pressure as other heads while emitting a lower total volume of water.

It is yet another object of the invention to provide a device which can be mounted in-line with one or more conventional high-precipitation sprinkler heads to provide low-precipitation operation thereof so as to prevent wasteful runoff of irrigation water.

It is still another object of the invention to provide a device which can be mounted in-line with one or more conventional high-precipitation sprinkler heads to provide proper operation thereof in the presence of low supply pressures and the like.

Other objects and benefits of the invention will become apparent from the description which follows hereinafter when taken in conjunction with the drawing figures which accompany it.

SUMMARY

The foregoing objects have been achieved by the control device of the present invention for controlling the flow of irrigation water between an inlet and an outlet thereof comprising, a hollow body having an inlet thereto and an outlet therefrom; a rotating drive positioned within the body; and, flow control means disposed within the body between the inlet and the outlet and driven by the rotating drive for varying the volume of water discharged through the outlet to areas watered by a sprinkler head connected to the outlet without changing the pressure of the water.

In the preferred embodiment, the rotating drive is a turbine drive including a turbine wheel positioned within the body to be rotated by a flow of water between the inlet and the outlet.

In one variation, the outlet is contained in an outlet member mounted to the body for rotation and the flow control means comprises means for rotating the outlet member at different rates as a function of the radial position of the outlet member. This latter means preferably comprises a variable speed drive connected to rotate the outlet member and driven by the turbine drive and sensing means connected to the outlet member and a speed changing input of the variable speed drive for sensing the radial position of the outlet member and for setting the speed of the variable speed drive to a pre-set speed corresponding to each radial position of the outlet member. Preferably, the sensing means comprises a cam member rotating with the outlet member and there is a speed changing member connected between the speed changing input of the variable speed drive and a programmable surface of the cam member. More specifically in the preferred embodiment, the variable speed drive comprises a drive wheel connected for rotation by the turbine drive and contacting a surface of the outlet member whereby the outlet member is rotated by the drive wheel as the drive wheel rotates and there are means for changing the radius of a point of contact of the drive wheel with the outlet member from a center thereof wherein the speed changing input causes the radius to change to a desired point of contact.

In an alternate embodiment intended to provide its benefits by a different approach, the flow control means comprises valve means disposed between the inlet and the outlet for controlling the volume of water flowing therebetween and the rotating drive is connected to control the opening and closing of the valve means as a function of time. In a variation of this embodiment, the outlet is contained in an outlet member mounted to the body for rotation; the rotating drive is a variable speed drive connected to rotate the outlet member and driven by a turbine drive; and additionally, there are means for changing the speed of the variable speed drive.

As in the other embodiment, it is preferred that the variable speed drive comprises a drive wheel connected for rotation by a turbine drive and contacting a surface of the outlet member whereby the outlet member is rotated by the drive wheel as the drive wheel rotates; and additionally, means for changing the radius of a point of contact of the drive wheel with the outlet member from a center thereof wherein the speed changing input causes the radius to change to a desired point of contact whereby the volume output of water of the control device is adjustable. Preferably, the means for changing the radius of a point of contact of the drive wheel with the outlet member comprises a moveable member connected to the drive wheel and there are indicia on the moveable member for indicating volume outputs of water of the control device associated with positions of the moveable member.

DESCRIPTION OF THE PREFERRED EMBODIMENTS:

The present invention will be described with respect to three basic embodiments. As will be noted and appreciated by those skilled in the art, each of the embodiments can be employed in either of two ways —as an in-line control device for a prior art sprinkler head (as by mounting in a branch pipe to control multiple heads or in a riser pipe to control a single head) or as a self-contained sprinkler head (e.g. mounted on the top of a riser pipe). In the interest of simplicity and the avoidance of redundancy, those portions of the present invention which are well known in the sprinkler art will not be shown in any detail.

Figure 2:
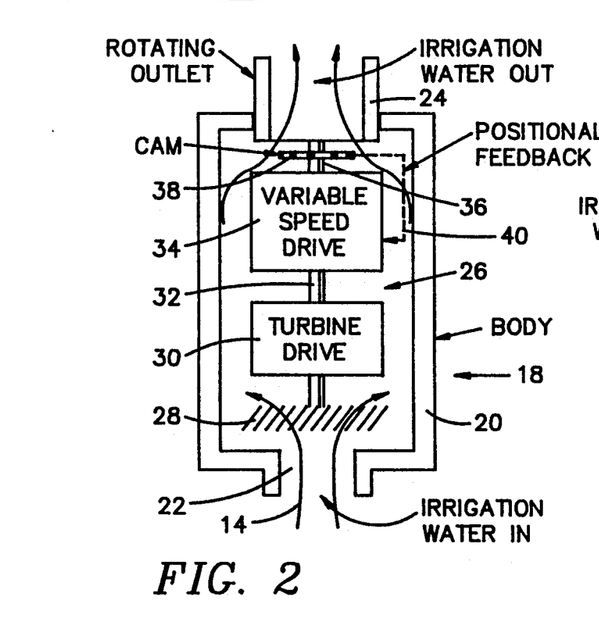
FIG. 2 is a simplified partial functional block diagram drawing a first embodiment of the present invention.

Referring first to FIG. 2 a control device 18 according to the present invention is depicted in an embodiment which will permit a single sprinkler head mounted in the manner of FIG. 1 to revolve more slowly when watering the dry spot 16a. The control device 18 comprises a body 20 having an inlet opening 22 connected to a source of irrigation water 14 under pressure. The body 20 also has an outlet 24 mounted for rotation through which the irrigation water 14 flows after passing through the body 20. As will be seen from more detailed drawings to be referred to later herein, the outlet 24 can have a prior art sprinkler head connected thereto or can have a sprinkler head incorporated therein.

To achieve the objects of the invention, the outlet 24 is rotated by an adjustable, variable-speed drive system, generally indicated as 26, disposed within the body 20. As the water 14 enters the inlet opening 22, it flows through a turbine wheel 28 connected to a turbine drive 30 substantially like those employed in the prior art, low-precipitation sprinkler heads mentioned above. The turbine drive 30 contains gears such that as the turbine wheel 28 spins rapidly as a result of the flow of water 14 therethrough, the output shaft 32 of the turbine drive 30 revolves slowly. The output shaft 32 of the turbine drive 30 is connected to the input of a variable speed drive 34 having an output shaft 36 connected to revolve the outlet 24. A control cam 38 is connected (as by being carried by the shaft 36) to revolve with the outlet 24. The cam 38 is sensed by the variable speed drive 34 through a feedback 40. The cam 38 is configured by the user at the time of installation to indicate the speed of rotation of the outlet 24 at the various points of its arc (or circle) of movement. For example, the cam 38 could be made of a soft plastic which can be cut (i.e. configured) with a pair of scissors or a sharp knife. Of course, those skilled in the art will readily recognize and appreciate that the control and programming functions of the cam 38 could be accomplished by other well known means all within the scope and spirit of the present invention. Thus, the outlet 24 (and the associated sprinkler head, not shown) is rotated at a variable rate depending on the amount of water 14 needed in a particular area as set by the cam 38. It should be noted that if a prior art impulse (or other rotating) sprinkler head is attached to the outlet 24, its rotation must be eliminated or at least set to only a few degrees of rotation or the benefits of the control device 18 will be superceded by the free rotation of the sprinkler head.

Figures 3, 4:
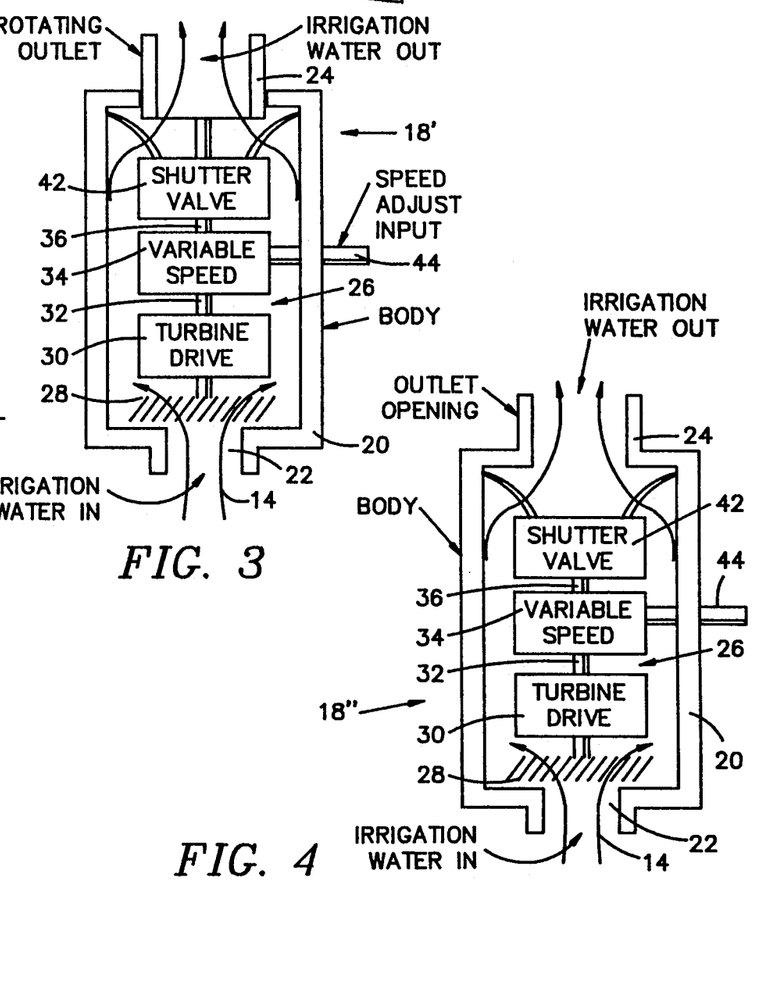
FIG. 3 is a simplified partial functional block diagram drawing a second embodiment of the present invention.
FIG. 4 is a simplified partial functional block diagram drawing a third embodiment of the present invention.

Turning now to FIG. 3, a control device 18' for rotating a sprinkler head while turning the water 14 off and on to achieve the object of regulating flow volume at a constant flow pressure and rate is shown. In this embodiment, the outlet 24 is rotated either by the adjustable, variable-speed drive system 26 or by the output shaft 32 (i.e. at a constant speed), as desired. The output shaft 36 of the variable speed drive 34 is connected to control the operation of a shutter valve 42 controlling the flow of water 14 through the body 20 between the inlet opening 22 and the outlet 24. The speed of the variable speed drive 34 is set by adjusting member 44 which is calibrated in percent of flow volume. In this embodiment, the variable speed drive 34 acts as a timer with respect to the opening and closing of the valve 42. Thus, if the member 44 is set to the "50%" position, the variable speed drive 34 will cause the valve 42 to be open fifty percent of the time. As a consequence, when the valve 42 is open the flow pressure and rate will be at the maximum level (as with all sprinkler heads in the system) so that the maximum area will be covered; however, only one-half of the volume of water 14 will be emitted, as desired.

The control device 18" of FIG. 4 operates in substantially the same manner as the device 18' of FIG. 3 with the exception that the outlet opening 24 does not revolve. Having thus described the present invention in general, the embodiments will now be described in more detail as to at least one way in which the functions of the novel aspects of the invention could be implemented. As those skilled in the art will readily recognize and appreciate, the specific examples now to be described are not the exclusive way in which the benefits of the invention could be achieved. Other ways of accomplishing the same functional results will be readily apparent to those skilled in the art. Moreover, in the interest of simplicity, the disconnectability aspects of portions of the body 20 as would be incorporated into a commercial embodiment of the present invention in order to make it possible to manufacture (typically of plastic by injection molding) and assemble the device are not depicted.

Figure 5:
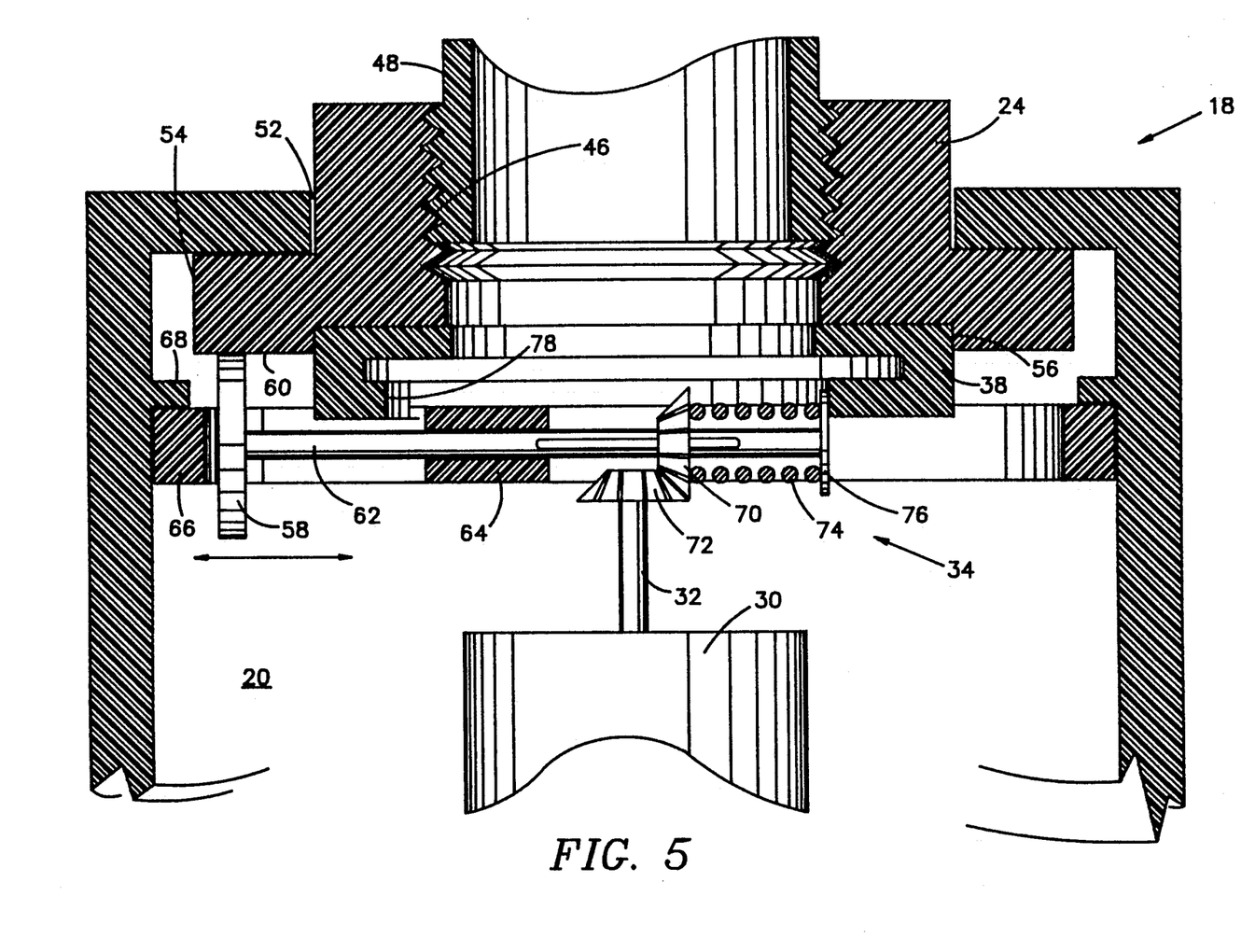
FIG. 5 is a detailed cutaway side view of the top portion of a sprinkler controller according to the present invention corresponding to the simplified drawing of FIG. 2 intended for placement in-line with one or more sprinkler heads.
Figure 6:
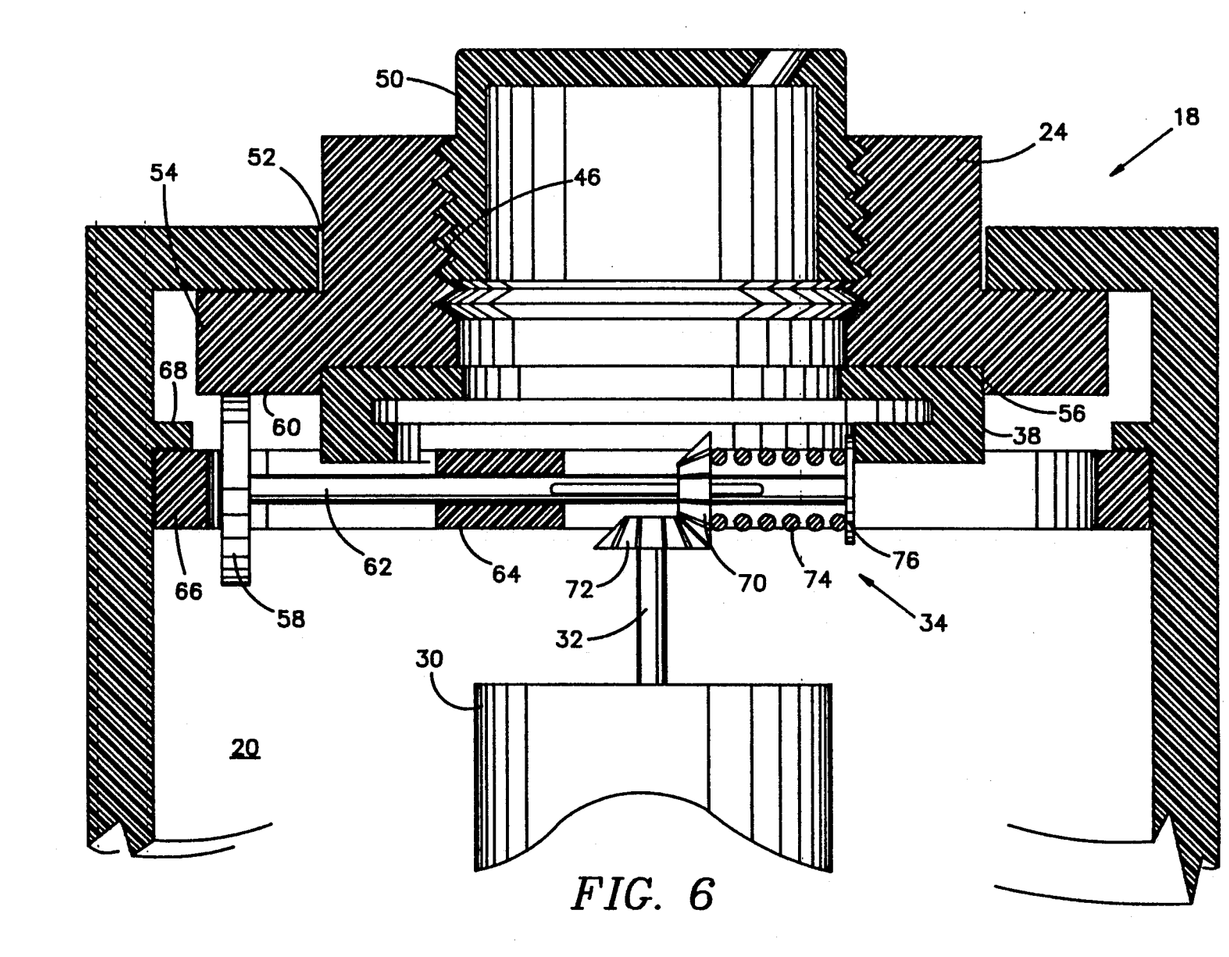
FIG. 6 is a detailed cutaway side view of the top portion of a sprinkler controller according to the present invention corresponding to the simplified drawing of FIG. 2 wherein a single sprinkler head is incorporated therein.

The top portion of a control device 18 as in FIG. 2 is shown in greater detail in FIGS. 5 and 6. In this embodiment (as with the others to be described later), the outlet 24 has a threaded bore 46 in the center thereof into which a sprinkler head riser pipe 48 (as in FIG. 5) or a sprinkler head 50 (as in FIG. 6) can be threaded. The outlet 24 is contained within a bore 52 in the top of the body 20 by a shoulder 54 extending radially outward therefrom which bears against the inner surface of the body 20 surrounding the bore 52. The cam 38 is annular in shape and press-fit into a concentric circular groove 56 in the bottom of the outlet 24. The variable speed drive 34 comprises a drive wheel 58 which bears against and drives the bottom surface 60 of the shoulder 54 as it rotates. The drive wheel 58 is mounted on the end of a shaft 62 slidably carried horizontally for rotation by the cross-member 64 of an annular member 66 pressed into the body 20 against a shoulder 68 formed around the inner periphery thereof. The shaft 62 is rotated by a first bevel gear 70 slidably (but nonrotatably) mounted on the shaft 62. The first bevel gear 70 is driven by a second bevel gear 72 mounted on the end of the output shaft 32 of the turbine drive 30. A compression spring 74 disposed about the shaft 62 between the first bevel gear 70 and an end stop 76 on the end of the shaft 62 biases the drive wheel 58 towards an inner (fastest rotation speed) position. The cam 38 has a inner surface 78 which bears against the end stop 76 and pushes the drive wheel 58 outward against the force of the spring 74 towards an outer (slowest rotation speed) position. By cutting the inner surface 78 of the cam 38, the cam 38 is programmed to rotate the outlet 24 at the desired speed at its various rotational positions.

Figure 7:
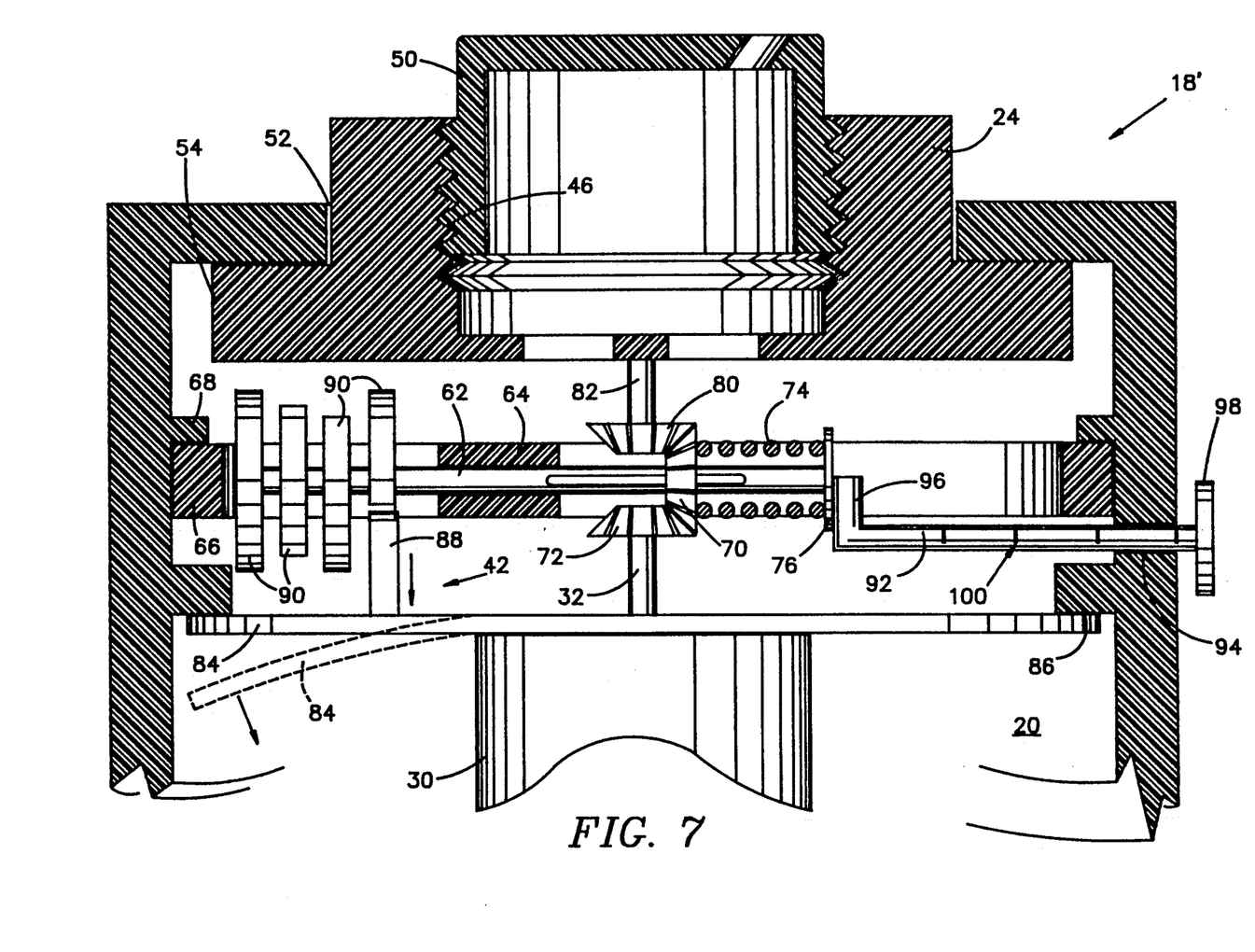
FIG. 7 is a detailed cutaway side view of the top portion of a sprinkler controller according to the present invention corresponding to the simplified drawing of FIG. 3 showing a single rotating sprinkler head incorporated therein.

Turning now to FIG. 7, the top portion of a control device 18' as shown in FIG. 3 is depicted in greater detail. Like portions to those of FIG. 6 are shown with like numbers. In this embodiment, the outlet 24 is rotated by a third bevel gear 80 mating with the first bevel gear 70 and connected to the outlet 24 by a concentrically disposed shaft 82. In actual practice, one would probably want to have the first and third bevel gears 70, 80 be of different size so that the points in the rotation of the outlet 24 at which the water is turned off and on varies over time such that, on average, the entire area of coverage is watered. The shutter valve 42 comprises a flexible diaphragm 84 mounted over the shaft 32 and seated against a shoulder 86 provided around the inner periphery of the body 20 for the purpose. Other approaches such as a spring-loaded valve member in a seat could, of course, be substituted if desired; and, such an arrangement will be shown in a later embodiment. The diaphragm 84 is moved away from the shoulder 86 (i.e. the valve 42 is opened) by a member 88 forcing it downward to the ghosted position as indicated by the arrows. In this embodiment, the drive wheel 58 is replaced by a plurality of adjacent cam members 90. Each of the cam members 90 has a differing portion of its periphery extending outward from the shaft 62 sufficiently to depress the member 88 to open the diaphragm 84. Thus, a semi-circular cam member 90 would open the valve 42 (i.e. diaphragm 84) fifty percent of the time. A 270° cam member 90 would, of course, open the valve 42 seventy-five percent of the time and, therefore, provide a seventy-five percent flow volume of water 14 to the area being watered. Typically one would expect the cam members 90 to be, for example, 360°, 270°, 180°, and 90° in active area so as to provide 100%, 75%, 50%, and 25% watering levels. Other levels could, of course, be employed by configuring the cam members 90 accordingly. The shaft 62 is slid inward and outward (from right to left and back as the figure is viewed) by an adjusting shaft 92 which is tightly (yet slidably) fit through a bore 94 in the body 20. The shaft 92 has an inner end 96 which bears against the end stop 76. The shaft 92 has a gripping knob 98 on the outer end and indicia 100 along its length corresponding to the positions of the cam members 90 over the member 88 whereby the desired watering level can be set by a user. As those skilled in the art will readily recognize and appreciate, since it is the flow of water 14 through the control device 18 which operates the mechanism therof, the valve 42 cannot completely shut off the flow of water 14 between the inlet opening 22 and the outlet 24. The valve 42 can be designed to have a low leakage therethrough or, for example, a small orifice opening could be provided through the diaphragm 84. Likewise, it will be recognized and appreciated that when the valve 42 is in its "closed" state, the turbine wheel 28 will not turn as fast and, therefore, the cam members 90 will not turn as fast as when the valve 42 is fully open. Thus, the configuration of the cam members 90 will have to be modified from the ideal conditions described above. That is, a semi-circular cam member 90 would not actually produce a 50% flow volume under actual conditions. If the turbine wheel 28 moved at 10% of its normal rate when the valve 42 were closed, the cam member 90 would actually have to open the valve 42 for approximately 327° to produce operation wherein the valve 42 was open about half the time (i.e. producing a 50% volume output). Another alternative would be to provide the turbine wheel 28 with a high inertia mass in association therewith so that the turbine wheel 28 would tend to "coast" from inertia when the valve 42 was closed rather than coming to a stop as soon as the water stopped flowing. In such case, it would be preferable to have the off and on cycles of the valve 42 of shorter duration as the water 14 within the body 20 would tend to have a braking effect on the turbine wheel 28. Some sort of minor leakage would, of course, still have to be provided through or past the valve 42 in the event that the sprinkler system stopped with the valve 42 in the closed position.

Figure 8:
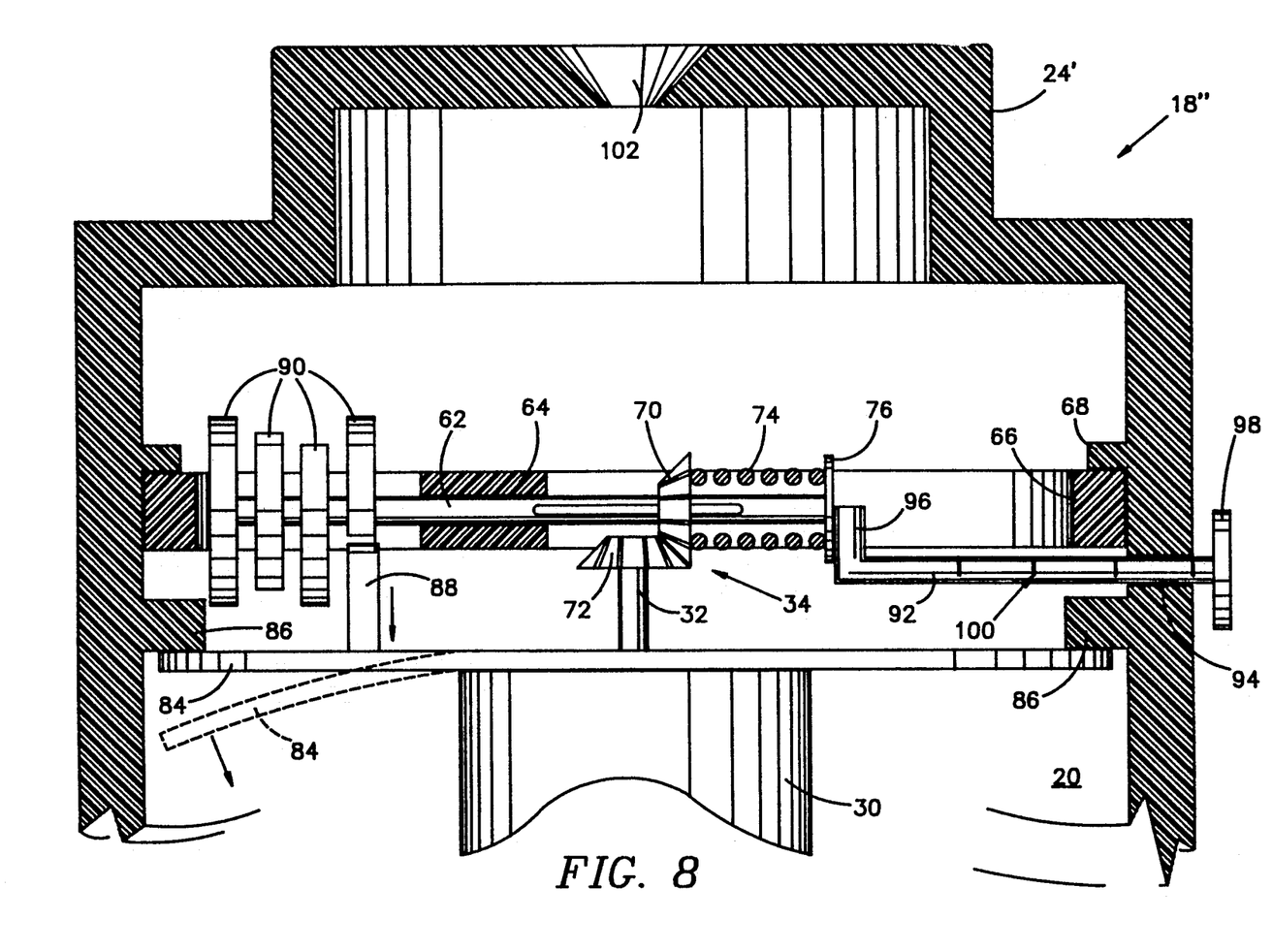
FIG. 8 is a detailed cutaway side view of the top portion of a sprinkler controller according to the present invention corresponding to the simplified drawing of FIG. 4 showing a fixed sprinkler head incorporated therein.

The control device 18" of FIG. 8 (corresponding to that of FIG. 4) contains the same shutter valve 42 arrangement; however, the rotating outlet 24 is replaced with a fixed outlet 24' molded into the top of the body 20 and having a sprinkler head outlet orifice 102 therethrough.

Figure 9:
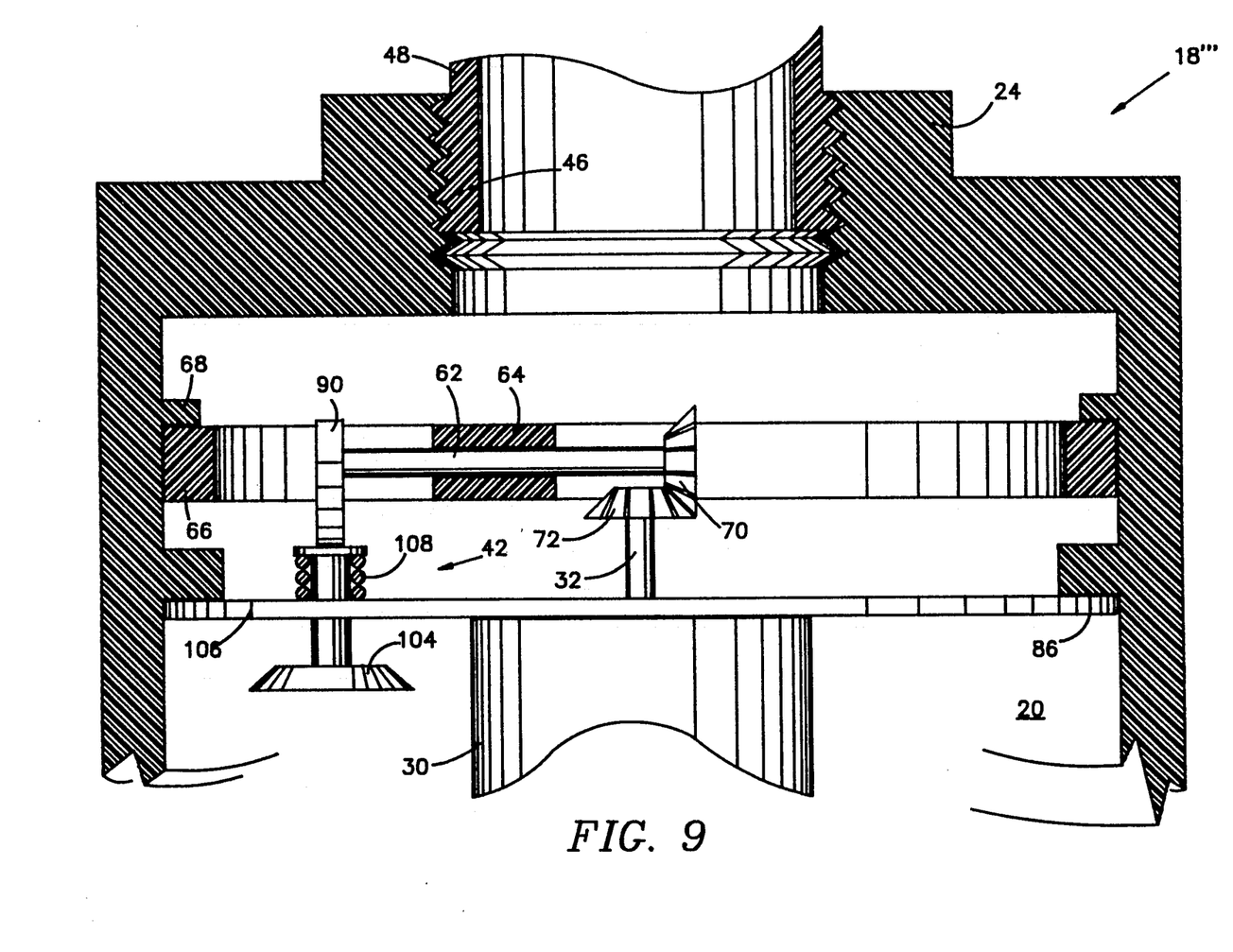
FIG. 9 is a detailed cutaway side view of the top portion of a sprinkler controller according to the present invention for use in-line with a conventional sprinkler head to provide low precipitation operation and proper operation in the presence of low supply pressure conditions.

Turning now to FIG. 9, a simplified version of the control device 18''' is shown which is intended to solve the remaining problems of the prior art as discussed under the Background of the Invention section above. To provide quasi low-precipitation operation of conventional sprinkler heads, the device 18''' is placed in-line with the pipe 48 supplying one or more sprinkler heads. A single cam member 90 is used to open the valve 42 which in this case comprises a poppet valve 104 disposed in a bulkhead 106 (replacing the diaphragm 84) and biased to a leakingly closed position (to provide needed water flow for operation) by a coil spring 108. As the cam member 90 operates the valve 42 (i.e. valve 104), the water 14 flows through the connected sprinkler head(s) in the normal manner for a time and is then turned virtually off for another period of time sufficient to allow the water 14 previously broadcast to penetrate the soil and sink in rather than run off. The cycle then repeats. As a result, while the instantaneous flow of water 14 through the sprinkler head(s) connected to the pipe 48 may be of a high precipitation rate, the average over time will be of a low precipitation rate. To the user, the only difference will be that the watering time may have to be increased slightly. On the other hand, since the efficiency of the irrigation system will be improved (i.e. run-off and wasted water virtually eliminated), some users may find that they actually get the necessary amount of water to the roots of their plants in less time.

To solve the low pressure problem (either from a low pressure supply line or as a result of too many sprinkler heads operating from the supply line simultaneously), the device 18''' is connected in-line with the riser pipe 48 to each sprinkler head. If the off/on cycle of the device 18''' is made fairly rapid (e.g. several seconds on and several seconds off), the differences in operation of the various devices 18''' as a result of manufacturing tolerances will result in the various devices 18''' moving in and out of phase with one another. This, of course, will cause the sprinkler heads attached thereto to be turned off and on at various times with respect to one another. Take two sprinkler heads by way of a simple example. When both are on together, the operation will be as without the devices 18''' and the output from the two sprinkler heads will be reduced. This will result in a particular watering pattern for a time. When one is on and the other is off, the one sprinkler head will receive full volume and produce a different watering pattern. The same will be true when their roles are reversed. It can thus be seen how various watering patterns will be produced by each sprinkler head when say five sprinkler heads are each connected through a device 18'''. As they move in and out of phase with one another, one, two, three, four, or five heads may be operating simultaneously resulting in five different watering patterns from each head. Again, the average over time will be a uniform watering pattern over the entire area being watered.

As a final note, as those skilled in the art will readily appreciate, where cost is not an object, the turbine drive approach as described above could be replaced with a battery-driven electrical drive run from replaceable batteries or rechargeable batteries (preferably recharged by solar panel). Also, the quasi low-precipitation operation could be effected through "pulsing" of the system operating valves under the control of an electrical or electronic controller such as those generally known in the irrigation and sprinkler art. Typically, such controllers turn on the supply valves at preset times and days for preset periods of time and then turn them off. By the addition of simple logic, the controllers could turn the valves on and off for periods of time within the operation period so as to eliminate (or at least reduce) the amount of run-off which typically occurs in hard-packed soil and/or on hillsides during continuous operation of the sprinkler heads. Both these alternate approaches are considered within the scope and spirit of this invention and are to be included within the scope of coverage provided by the claims. With respect to the "pulsing" of the controller output to the control valves operating the sprinkler lines, the supplemental timing function could be incorporated into the controller (new controllers) or could be provided in a small box powered by the valve opening voltage and containing a timing circuit controlling a switch placed in series with the connection to the valve (for retrofitting).

Figure 10:
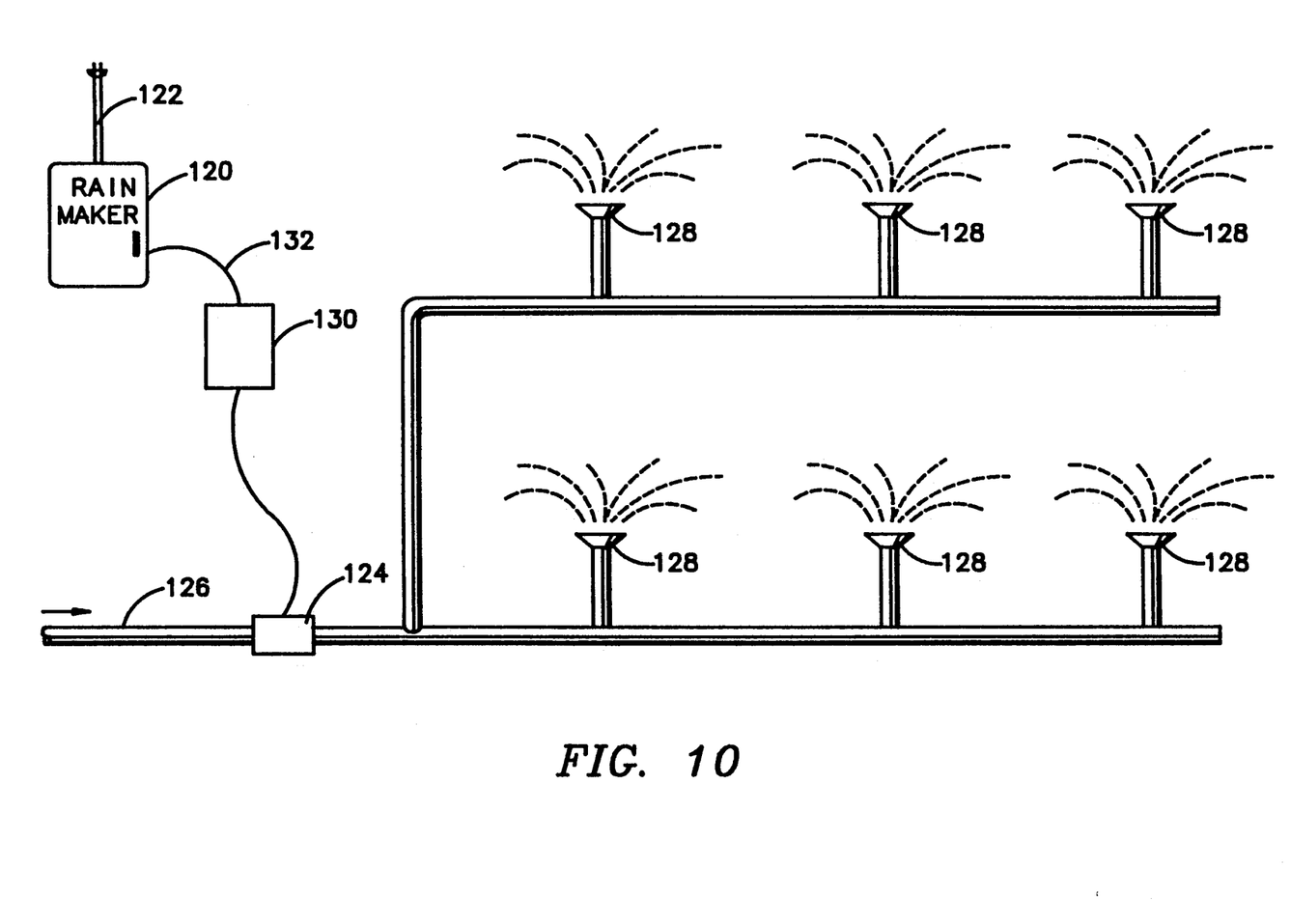
FIG. 10 is a simplified drawing showing how the present invention in the form of a suplemental timer switch can be placed in series between an electrical controller and the control wire controlling the opening and closing of a solenoid valve controlling water flow to a plurality of sprinkle heads.

For example, as shown in FIG. 10, an electrical sprinkler controller 120 connected to a source of electrical power through line 122 is typically connected to electrically control the opening and closing of a solenoid valve 124 which controls the flow of water in a source pipe 126 to a plurality of sprinkler heads 128 connected thereto. By inserting a supplemental electrical timer 130 according to the teachings of the present invention as set forth above in series with the wire 132 from the controller 120 to the solenoid valve 124, the sprinkler heads 128 can be made to operate in a low precipitation manner. When a pre-selected time and day for sprinkling arrives, the controller 120 will energize the wire 132 to the solenoid valve 124. The supplemental electrical timer 130 of this invention, however, makes and breaks the electrical connection through the wire 132 to turn the sprinkler heads off and on as described above. As mentioned above, the functions of the supplemental electrical timer 130 could, of course, be incorporated into the controller 120 itself, if desired.

Wherefore, having thus described our invention, what is claimed is:

1. A control device for controlling the flow of irrigation water between an inlet and an outlet thereof comprising:

(a) a hollow body having an inlet thereto and an outlet therefrom, said outlet being contained in an outlet member mounted to said body for rotation;

(b) a rotating drive positioned within said body, said rotating drive being a turbine drive including a turbine wheel positioned within said body to be rotated by a flow of water between said inlet and said outlet; and, (c) flow control means disposed within said body between said inlet and said outlet and driven by said rotating drive for varying the volume of water discharged through said outlet to areas watered by a sprinkler head connected to said outlet without changing the pressure of said water, said flow control means comprising means for rotating said outlet member at different rates as a function of the radial position of said outlet member.

2. The control device of claim 1 wherein said flow control means comprises:

(a) valve means disposed between said inlet and said outlet for controlling the volume of water flowing therebetween; and, (b) said rotating drive is connected to control the opening and closing of said valve means as a function of time.

3. The control device of claim 2 wherein:

(a) said rotating drive is a variable speed drive; and additionall comprising, (b) means for changing the speed of said variable speed drive.

4. The control device of claim 3 wherein:

(a) said variable speed drive comprises a drive wheel connected for rotation by a turbine drive and contacting a surface of said outlet member whereby said outlet member is rotated by said drive wheel as said drive wheel rotates; and additionally comprising, (b) means for changing the radius of a point of contact of said drive wheel with said outlet member from a center thereof wherein said speed changing input causes said radius to change to a desired point of contact whereby the volume output of water of the control device is adjustable.

5. The control device of claim 4 wherein:

(a) said means for changing the radius of a point of contact of said drive wheel with said outlet member comprises a moveable member connected to said drive wheel; and, additionally comprising, (b) indicia on said moveable member for indicating volume outputs of water of the control device associated with positions of said moveable member.

6. The control device of claim 2 wherein:

(a) said outlet is contained in an outlet member mounted to said body for rotation;

(b) said rotating drive is a variable speed drive connected to rotate said outlet member and driven by a turbine drive; and additionally comprising, (c) means for changing the speed of said variable speed drive.

7. The control device of claim 1 wherein said means for rotating said outlet member at different rates as a function of the radial position of said outlet member comprises:

(a) a variable speed drive connected to rotate said outlet member and driven by said turbine drive; and, (b) sensing means connected to said outlet member and a speed changing input of said variable speed drive for sensing the radial position of said outlet member and for setting the speed of said variable speed drive to a pre-set speed corresponding to each radial position of said outlet member.

8. The control device of claim 7 wherein:
(a) said sensing means comprises a cam member rotating with said outlet member; and additionally comprising,
(b) a speed changing member connected between said speed changing input of said variable speed drive and a programmable surface of said cam member.

9. The control device of claim 7 wherein:
(a) said variable speed drive comprises a drive wheel connected for rotation by said turbine drive and contacting a surface of said outlet member whereby said outlet member is rotated by said drive wheel as said drive wheel rotates; and additionally comprising,
(b) means for changing the radius of a point of contact of said drive wheel with said outlet member from a center thereof wherein said speed changing input causes said radius to change to a desired point of contact.

10. The control device of claim 9 wherein:
(a) said sensing means comprises a cam member rotating with said outlet member; and additionally comprising,
(b) a speed changing member connected between said speed changing input of said variable speed drive and a programmable surface of said cam member.

11. In an irrigation sprinkler head having an inlet for receiving water under pressure and a rotating outlet member rotating through an arc of operation to water an area by broadcasting water in a stream from a nozzle opening of the outlet member to portions of the area as the outlet member rotates, the improvement for allowing the sprinkler head to provide different volumes of water to different portions of the area at a constant pressure comprising:
(a) variable speed drive means connected for rotating the outlet member, said variable speed drive including a turbine drive having a turbine wheel positioned to be rotated by a flow of irrigation water to the sprinkler head;
(b) position sensing means for sensing the radial position of the outlet member within its art of operation and for setting the speed said variable speed drive means is rotating the outlet member to a speed preset to be associated with the instant radial position of the outlet member, said position sensing means comprising a cam member rotating with the outlet member; and,
(c) a speed changing member connected between a speed changing input of said variable speed drive and a programmable surface of said cam member.

12. The improvement to an irrigation sprinkler head of claim 11 wherein:
(a) said variable speed drive comprises a drive wheel connected for rotation by said turbine drive and contacting a surface of the outlet member whereby the outlet member is rotated by said drive wheel as said drive wheel rotates; and additionally comprising,
(b) means for changing the radius of a point of contact of said drive wheel with the outlet member from a center thereof wherein said speed changing input causes said radius to change to a desired point of contact.

13. The improvement to an irrigation sprinkler head of claim 12 wherein:
(a) said sensing means comprises a cam member rotating with the outlet member; and additionally comprising,
(b) a speed changing member connected between said speed changing input of said variable speed drive and a programmable surface of said cam member.

14. In an irrigation controller which opens a supply valve to input a supply of irrigation water under pressure to at least one sprinkler head for a pre-established irrigation period at pre-set times and days, the improvement to permit high-precipitation irrigation sprinkler heads to achieve average low-precipitation operation over the irrigation period comprising:
a secondary timer connected in series with the controller to control the opening and closing of the supply valve to, when the irrigation period begins, initially connect the supply of irrigation water to the sprinkler head, allow irrigation water to flow to and through the sprinkler head for a period of time less than that required to produce run-off of the water from an area being watered by the sprinkler head, break the connection between the supply of irrigation water and the sprinkler head, delay for a period of time sufficient to allow previously broadcast water time to soak into the area being watered by the sprinkler head, and repeating a cycle of connecting and breaking the connection between the supply of irrigation water and the sprinkler head until the irrigation period is completed.

15. The improvement to an irrigation controller of claim 14 wherein:
(a) the supply valve is an electrically operated valve;
(b) the irrigation controller has an electrical connection to the supply valve; and,
(c) said secondary timer is electrically connected in series with said electrical connection.

16. The method of operating a plurality of high-precipitation irrigation sprinkler heads to achieve average low-precipitation operation over a period of irrigation watering comprising the steps of:
(a) simultaneously turning on a supply of irrigation water under pressure connected to all the sprinkler heads;
(b) allowing irrigation water to flow to and through all the sprinkler heads for a period of time less than that required to produce run-off of the water from an area being watered by the sprinkler heads;
(c) simultaneously turning off the supply of irrigation water to all the sprinkler heads;
(d) delaying for a period of time sufficient to allow previously broadcast water time to soak into the area being watered by the sprinkler heads; and,
(e) returning to step (a) if the period of irrigation watering is not complete.

* * * * *